United States Patent [19]
Kozacka et al.

[11] Patent Number: 5,881,799
[45] Date of Patent: Mar. 16, 1999

[54] PERIMETER SEALING ELEMENT FOR REGENERATIVE HEAT EXCHANGER

[76] Inventors: Wayne R. Kozacka, 26041 Red Corral Rd., Laguna Hills, Calif. 92653; Jackie L. Kaser, 15810 Lindina Dr., Riverside, Calif. 92504

[21] Appl. No.: 17,000

[22] Filed: Feb. 2, 1998

Related U.S. Application Data

[60] Provisional application No. 60/020,402 Jun. 25, 1996.

[51] Int. Cl.[6] .................................................. F23L 15/02
[52] U.S. Cl. ......................... 165/9; 165/8; 165/DIG. 20; 165/DIG. 21; 165/DIG. 26; 277/550
[58] Field of Search ........................... 165/8, 9, DIG. 20, 165/DIG. 21, DIG. 22, DIG. 24, DIG. 26; 277/370, 550, 551, 932, 931

[56] References Cited

U.S. PATENT DOCUMENTS

| | | |
|---|---|---|
| 2,517,512 | 8/1950 | Tigges et al. ............... 165/DIG. 24 X |
| 2,680,598 | 6/1954 | Trulsson et al. ............ 165/DIG. 20 X |
| 3,113,526 | 12/1963 | Paschke . |
| 3,882,927 | 5/1975 | Penny . |
| 4,433,848 | 2/1984 | Williams . |
| 4,673,026 | 6/1987 | Hagar et al. ................................. 165/9 |
| 4,940,080 | 7/1990 | Reeves et al. ............... 165/9 |
| 4,997,028 | 3/1991 | Townsend ................... 165/9 |
| 5,228,703 | 7/1993 | White . |
| 5,657,998 | 8/1997 | Dinc et al. . |

Primary Examiner—Ira S. Lazarus
Assistant Examiner—Christopher Atkinson
Attorney, Agent, or Firm—Knobbe, Martens, Olson & Bear, LLP

[57] ABSTRACT

A seal for a regenerative air preheater. The seal is comprised of two members that each have a plurality of tabs and slots. The tabs and slots interlock so that the tabs on one member are positioned adjacent the slots on the other member. Further, the tabs have a narrow neck section and a wider sealing section. The wider sealing sections overlay and the narrow neck sections are positioned within a recessed region of the notch on the opposite member so as to interlock the two members. Preferably, the neck sections do not significantly overlap thereby providing greater flexibility for each of the tabs. The seal is mounted either to the rotor or to the inner wall of the housing so as to extend through the bypass gap between the rotor and the inner wall of the housing. As the tabs are flexible, the tabs can resiliently deform as a result of the tabs making contact with the sealing surface of the heat exchanger.

20 Claims, 5 Drawing Sheets

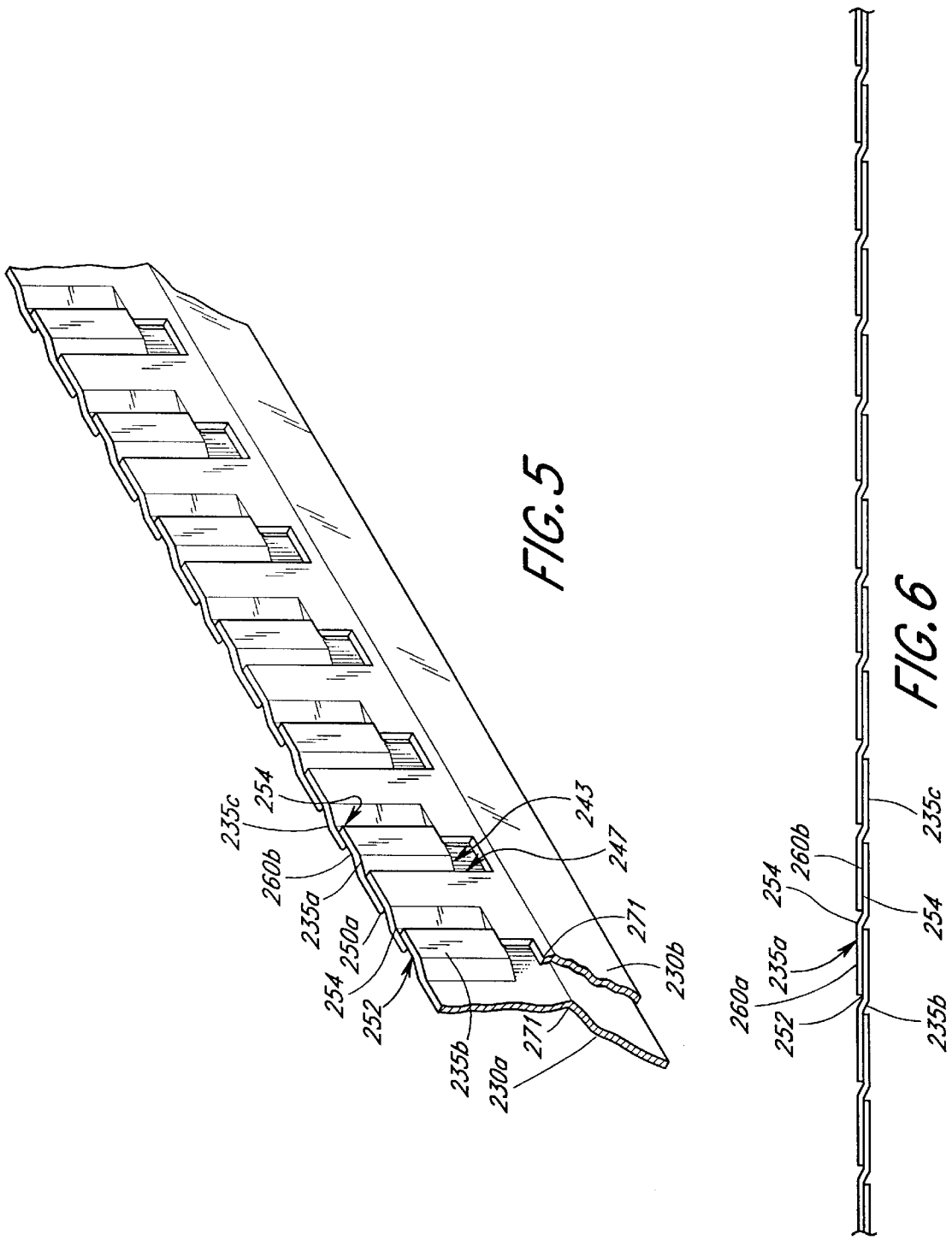

PERIMETER SEALING ELEMENT FOR REGENERATIVE HEAT EXCHANGER

RELATED APPLICATIONS

This application is a continuation of International Application PCTUS97/11031, filed Jun. 25, 1997, which claims priority under Title 35, USC § 119(e) to U.S. Provisional Application Ser. No. 60/020,402, filed Jun. 25, 1996.

BACKGROUND OF THE INVENTION

1. Field of the Invention

The present invention relates to a seal for a regenerative heat exchanging system. More particularly, the present invention relates to an improved seal that is used to prevent bypass leakage of hot gas or cold air through a heat exchanging system.

2. Description of the Related Art

Regenerative heat exchangers are used with many types of machinery that exhaust hot gas and operate more efficiently when supplied with preheated air. These types of machinery include power plants, chemical processors, refineries, pulp and paper mills, and ship engines. Typically, two fluid stream passages extend through a heat exchanger. The first passage is an exhaust or hot gas conduit that communicates with a hot exhaust outlet of the machinery. Hot exhaust gases flow from the machinery exhaust into the hot gas conduit to the heat exchanger. The second passage is an intake or cold air conduit that communicates with a cold air intake passage of the machinery. The cold air conduit feeds air into the intake passage of the machinery. As is known in the art, the regenerative heat exchanger extracts heat from the exhaust gases of the machinery and transfers the heat to the cool air conduit, so that the machinery is supplied with heated intake air which improves the operating efficiency of the machinery.

One typical heat exchanger includes a movable heat exchanging body that moves between the hot gas conduit and the cool air conduit. The movable heat exchanging body cyclically collects heat from the exhaust conduit and transfers this heat energy to the intake conduit. In this manner, the heat from the machinery exhaust is used to warm the air that is being supplied via the intake conduit to the machinery. By supplying the machinery with preheated air, the efficiency of the machinery is improved. Additionally, the heat exchanger is environmentally friendly as it recycles heat that would otherwise be exhausted into the earth's atmosphere.

This type of heat exchanger is referred to as a Ljungstrom™-style preheater. The heat exchanging body in a Ljungstrom-style preheater is typically cylindrical in shape and is located in a sealed relationship with an outer housing. The heat exchanging body, typically called a rotor, rotates about a center shaft within the housing of the heat exchanger. A plurality of radial walls extend radially outward from the center shaft and subdivide the heat exchanging body into a plurality of angular sectors. The angular sectors have a core material to provide a path for heated exhaust or intake air to travel through. The core is heated by the exhaust and the heat energy of the core is transferred to the intake air when the heated core is exposed to the intake air. As the heat exchanging body rotates, the angular sectors are alternatively exposed to the hot and cold conduits of the heat exchanging apparatus. Hence, as an angular sector of the heat exchanging body is exposed to the hot conduit, it absorbs heat from the exhaust gases of the machinery. The sector then rotatably moves and is exposed to the intake conduit where the sector then releases heat into the cool air that is passed into the machinery intake.

One difficulty with these heat exchangers is that there is typically a gap that exists between the rotor and the inner walls of the housing. Consequently, some heated gas in the exhaust conduit, may flow through the gap between the rotor and the inner wall of the housing and thereby bypass the core material in the rotor. Similarly, cool air in the intake conduit may also flow through the bypass gap between the rotor and the inner wall of the housing similarly bypassing the core material of the rotor. It will be appreciated that the amount of gas that bypasses the core material of the rotor in both the exhaust conduit and the intake conduit reduces the efficiency of the heat exchanger as a greater amount of unheated air is being provided to the power plant and a greater amount of heated gas is being exhausted through the exhaust conduit without heating the rotor.

To address this particular problem, seals are typically installed at the upper and lower surfaces of the rotor which extend into the gap between the outer surface of the rotor and the inner surface of the housing. These seals are typically referred to as either circumferential or bypass seals and they generally extend around the entire circumference of the rotor. These seals can either be mounted on the rotor so as to extend outward against a surface on the inner wall of the housing or they can be mounted on the housing so as to extend inward towards a surface on the rotor. In effect, these seals occlude the opening between the inner wall of the housing and the outer wall of the rotor and thereby direct the hot gas in the exhaust conduit through the core material of the rotor and similarly direct the cool air in the intake conduit through the core material of the rotor.

One difficulty associated with the use of these seals is that the rotor will generally deform during operation as a result of differential thermal expansion. This deformation is typically referred to as turndown and is often exhibited by the outer surfaces of the rotor sagging downward with respect to the center axis and toward the housing. It will be appreciated that a bypass seal mounted on the outer surface of the rotor that is positioned so as to be immediately adjacent the inner wall of the housing will make contact with the housing when the rotor turns down. This may result in the seal becoming unduly worn or damaging the inner walls of the housing.

One solution to this problem is to position a seal in the bypass space so that a measured gap remains between the outer surface of the seal and the adjacent wall. The measured gap is selected so that when the rotor deforms as a result of turndown, the outer surface of the seal is positioned immediately adjacent the wall. However, positioning a seal in this manner results in the seal not being particularly efficient when the heat exchanger has not fully turned down as gases can flow through the measured gap, thereby reducing the efficiency of the heat exchanger. Further, the degree of turndown of the heat exchanger may vary or even be unknown during operation which could result in a gap remaining during operation of the heat exchanger thereby reducing the efficiency of the heat exchanger.

Another possible solution is to use a seal that is flexible so that when the heat exchanger turns down, the seal can resiliently contact the sealing surface. A flexible seal can then be positioned substantially adjacent the sealing surface prior to turndown thereby allowing the seal to substantially occlude the bypass opening over the entire range of deformation of the rotor. However, as the seal will continuously be rubbing against the sealing surface, it is generally desirable that the seal be relatively thick so as to prolong the life of the seal against damage and the continuous wear of rubbing against the sealing surface. However, increasing the thickness of the seal to prolong the life of the seal against damage and wear naturally results in a decrease of the flexibility of the seal.

One possible solution to this problem is illustrated by the prior art seal shown in FIG. 3. As shown in FIG. 3, the seal is comprised of two relatively thick seal members 100a and 100b with a plurality of slots 102 formed therein to allow the seal to conform to the curvature of the rotor of housing. The slots 102 thereby define a plurality of tabs 104. In some applications only a single seal member 100a is mounted in the heat exchanger so that the tabs 104 can make contact with a sealing surface and partially occlude the bypass gap. As the tabs 104 are not connected to each other, they have a degree of independent resilience which allows the tabs 104 to deform against the sealing surface when the heat exchanging body deforms as a result of turndown. However, the slots 102 will still allow for some heated gases in the hot gas conduit and some cold air in the cool air conduit to bypass the heat exchanging body. The Applicant has observed heat exchanger installations using these types of seals that have an approximately 6% efficiency loss that is attributable directly to the notches 102 in the seals.

In other applications, two identical seals 100 are positioned adjacent each other in the manner shown in FIG. 3. Specifically, the tabs 104 on one seal are positioned to overlap the slots 102 on the other seal. While this will reduce the efficiency loss stemming from air and exhaust gases escaping through the slots 102, the seal is increased in thickness and is therefore significantly less flexible. The loss in flexibility often requires that these types of seals to be positioned away from the sealing surface so as to account for the deformation of the heat exchanging body occurring as a result of turndown. Further, even with overlapping seals, a gap typically remains right at the sealing surface even when two seal members are overlapping. This gap results from the seals contacting the surface at an acute angle which prevents the upper seal from contacting the sealing surface without the slots in the upper seal providing an additional leakage path. Hence, while these types of seals provide some improvement to efficiency loss in heat exchangers, they still result in inefficient operation as air and gases can bypass the heat exchanging body through the bypass gap.

Consequently, there is a need for an improved seal that can be mounted in the bypass gap between the heat exchanging body and the inner wall of a housing of a heat exchanger that will reduce the inefficiencies of the heat exchanger that result from air and gases bypassing the heat exchanging body. In particular, there is a need for a seal which can be mounted in the bypass gap so as to be positioned immediately adjacent a sealing surface so as to substantially close off the bypass gap. To this end, the seal should be flexible so that when the heat exchanging body deforms as a result of turndown, the seals can be deformed by the sealing surface while simultaneously maintaining resilient contact with the sealing surface. This seal should also be configured so as to be both flexible and yet capable of withstanding a significant amount of wear as a result of continuous rubbing contact with the sealing surface.

SUMMARY OF THE INVENTION

The aforementioned needs are satisfied by the perimeter seal of the present invention which is comprised of a seal that has a mounting section that is configured to be mounted on the heat exchanger and a plurality of flexible tabs that are configured to make resilient contact with a sealing surface within the heat exchanger so that a bypass gap between the heat exchanging body and the inner wall of a housing containing the heat exchanging body is substantially occluded by the seal. In one aspect of the present invention, the plurality of tabs are interlocked so as to provide structural rigidity for the seal. However, the plurality of tabs are also configured to be independently flexible so as to be able to resiliently deform in response to the tabs contacting the sealing surface as a result of turndown of the heat exchanging body.

In one embodiment, the seal is comprised of two members each having a mounting member and each having a plurality of flexible tab members extending out of a first side of the mounting member wherein adjacent tabs on each member are separated from each other by slots. The flexible tab members are preferably configured so that the flexible tab members on the first member are positionable within the slots on the second member so that the tabs on the first member overlap the tabs on the second member. In this embodiment, the tabs are preferably interlocking so that the two members can be positioned together with the tabs interlocking so that the tabs retain the first and second members together. Each of the tabs on the first member are preferably positioned in the slots on the second member so that a tab on the first member is positioned adjacent a first face of a first tab on the second member, then extend through the slot between a first and second tab on the second member so as to then be positioned adjacent a second face of the second member. Hence, each of the tabs on the first member are positioned so as to be adjacent alternate faces of the tabs on the second member while extending through the slots between the adjacent tabs on the second member. The tabs on the second member are similarly oriented.

Hence, in this embodiment, the tabs on each member fill the slots on the opposite member and thereby reduce the likelihood of leakage of air or hot gases through the slots. Further, in this embodiment, one lateral side of each of the tabs on either member is reinforced by a tab on the second member which provides structural stability to the seal. However, as the tabs are overlapping, the other lateral side on each of the tab members is not reinforced by a tab member on the other member which provides for greater flexibility for each of the tabs. Hence, the seal of this embodiment has greater flexibility while maintaining a high degree of structural rigidity.

In one embodiment, the interlocking flexible seal is adapted to be mounted on the heat exchanging body so that the tabs are positioned against a sealing surface on the inner wall of the housing. In a second embodiment, the interlocking flexible seal is configured to be mounted on the inner wall of the housing so that the interlocking flexible tabs are positioned immediately adjacent a sealing surface defined by the heat exchanging body. In either embodiment, the seal is preferably configured so that the interlocking tabs are sufficiently flexible to permit the tabs to be positioned immediately adjacent the sealing surface at start up of the heat exchanging body. Further, the flexible interlocking tabs are also configured to be sufficiently flexible that as the heat exchanging body undergoes deformation as a result of turndown, the tabs can deform away form the sealing surface while simultaneously maintaining resilient contact with the sealing surface. Hence, the tabs are configured to maintain contact with the sealing surface over a range of positions resulting from deformation of the rotor due to turndown.

It will be appreciated that the seal of the preferred embodiment occludes a greater amount of the bypass gap thereby forcing more of the air and gases through the heat exchanging body. Further, the flexibility of the interlocking tabs allows the seal of the preferred embodiment to be positioned immediately adjacent the sealing surface at start up while permitting the tabs to be resiliently urged away from the sealing surface as a result of deformation of the heat exchanging body during turndown. Consequently, the seals of the preferred embodiment can maintain a high degree of contact with the sealing surface during all phases of operation of the heat exchanger. These and other advantages of the present invention will become more apparent from the following description taken in conjunction with the accompanying drawings.

BRIEF DESCRIPTION OF THE DRAWINGS

FIG. 5 is an assembled view of the seal of FIG. 4 with the first seal member and the second seal member positioned so that the plurality of tabs on each of the members interlock and overlap to thereby define a flexible sealing surface; and FIG. 6 is a top view of the seal shown in FIG. 5.

DETAILED DESCRIPTION OF THE PREFERRED EMBODIMENT

Figure 1:
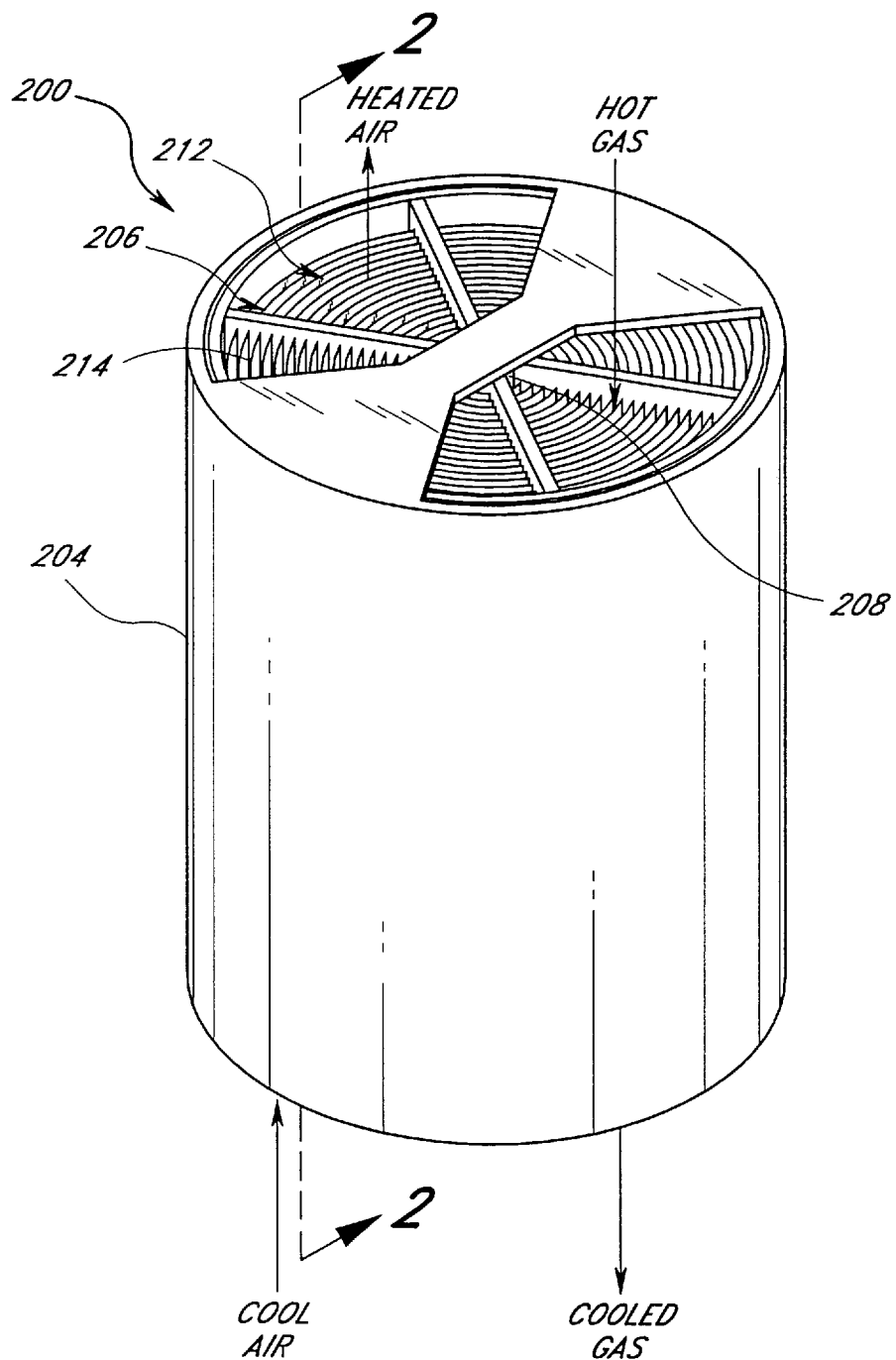
FIG. 1 is a simplified perspective view of an exemplary heat exchanger.

Reference will now be made to the drawings wherein like numerals refer to like parts throughout. FIG. 1 illustrates a heat exchanger 200 which in this embodiment is comprised of a heat exchanger body 202 that is positioned within a housing 204. In this embodiment, the heat exchanger body 202 is comprised of a cylindrical rotor that is rotatably mounted within the cylindrical housing 204 so as to be coaxial with the cylindrical housing 204. The heat exchanger housing 204 defines two openings 206 and 208. The two openings 206 and 208 are respectively connected to duct work (not shown) and respectively form a portion of the intake or cold air conduit and the exhaust or hot gas conduit. The housing 204 also includes a sector plate 210 which divides the intake conduit from the exhaust conduit in a manner that is known in the art.

The rotor 202 in this embodiment is preferably cylindrical and rotates within the housing 204. The rotor 202 is divided into sectors 212 wherein each of the sectors includes a core material 214 that absorbs heat carried in the exhaust gas in the exhaust conduit and then transfers this heat to the intake air when the heated sector 212 is positioned within the intake conduit. The core material 214 is typically made of thin corrugated metal that will allow exhaust gases to travel therethrough and heat carried within the exhaust gases heats the core material 214 in the exhaust conduit. Similarly, cool air passing through the core material 214 in the intake conduit is heated by the retained heat of the core material 214 during passage of the intake air through the core material 214. Hence, the preheater sequentially exposes the sectors 212 to the hot gas in the exhaust conduit so that the core material 214 is heated and then exposes the heated sectors 212 of core material 214 to the intake conduit so that cool air traveling through the intake conduit can be heated by the core material 214 to thereby supply heated air to the machinery. The operation of the heat exchanger 200 is identical to the operation of well known Ljunstrom-type preheaters of the prior art. It will be appreciated from the following description that, while this embodiment of the perimeter seal is configured to be used with a Ljungstrom-type preheater, that the perimeter seal can be adapted to a Rothmule-type preheater, where the rotor is stationary and the ductwork rotates with respect to the rotor, without departing from the spirit of the present invention.

Figure 2A:
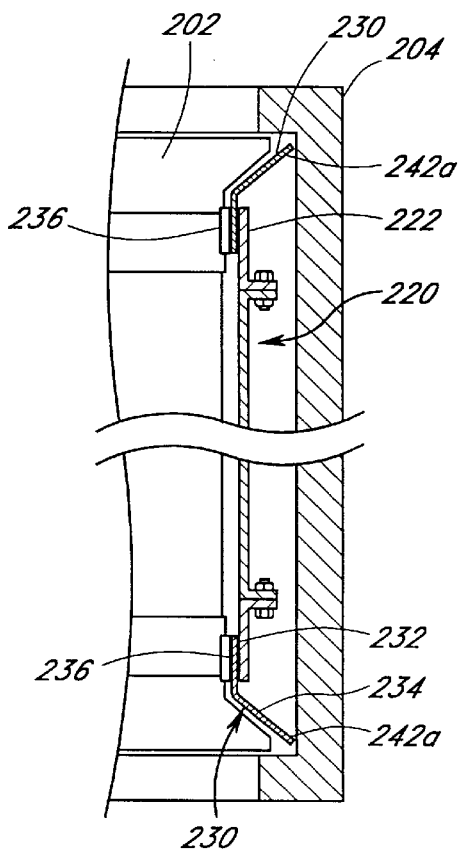
FIGS. 2A and 2B are simplified sectional views of the heat exchanger of FIG. 1 illustrating two embodiments of how the seal of the preferred embodiment is mounted within the heat exchanger of FIG. 1.
Figure 2B:
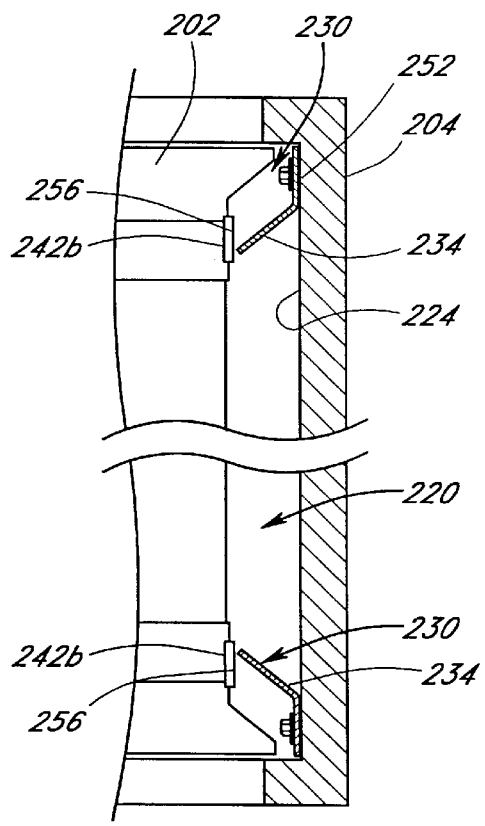
Figure 3:
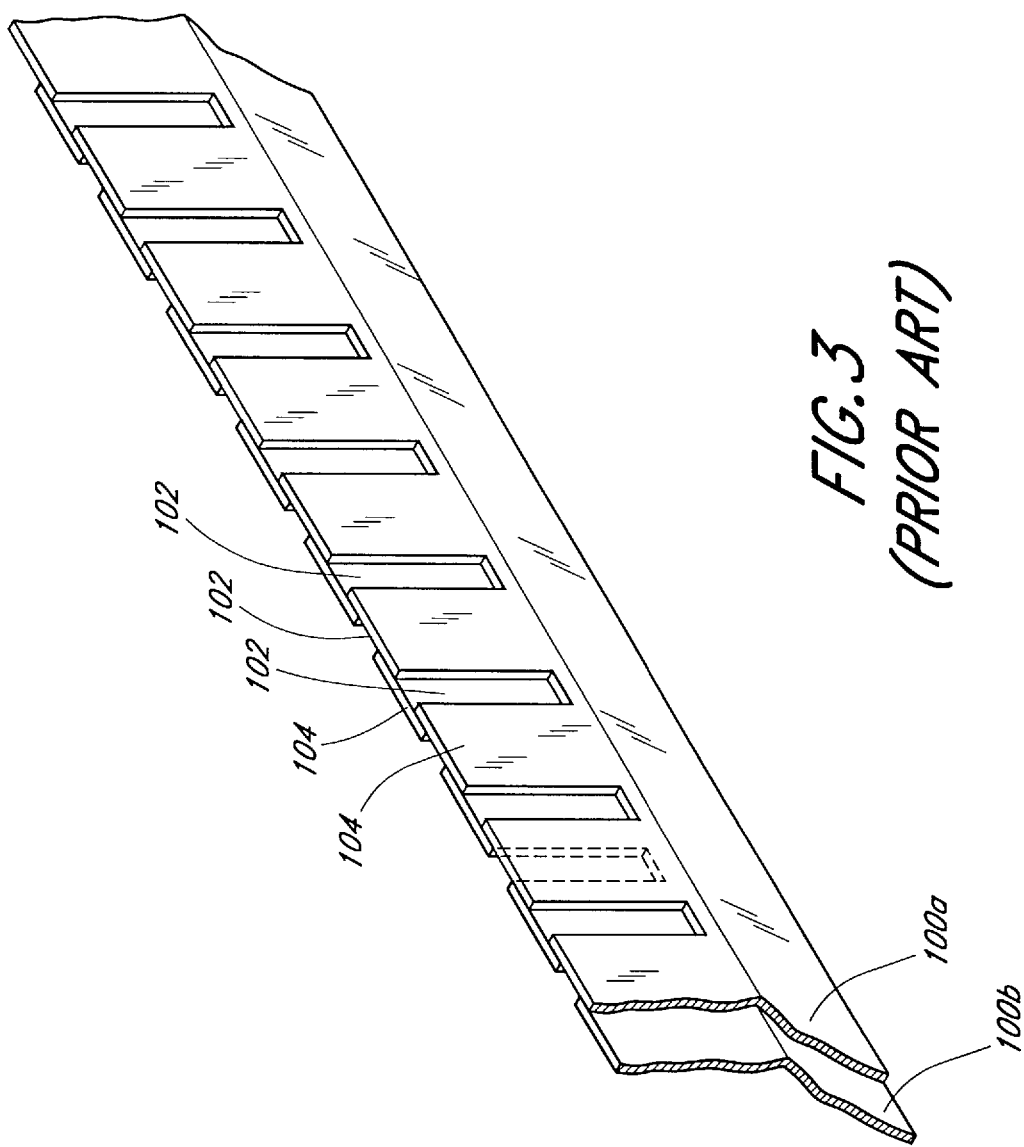
FIG. 3 is a perspective view of a prior art seal.

FIGS. 2A and 2B illustrate that there is a bypass gap 220 between the outer periphery 222 of the rotor 202 and the inner wall 224 of the housing 204. The bypass gap 220 provides a path for intake gas or exhaust gas to bypass the core 202 when flowing through the intake conduit or the exhaust conduit. It will be appreciated that this bypass gap 220 reduces the efficiency of the preheater 200 as it allows for some exhaust gas to traverse the preheater 200 without heating the core material 214 and further allows intake air to traverse the preheater 200 without being heated by the core material 214. To address this particular problem, perimeter seals 230 are mounted adjacent the upper and bottom ends of the rotor 202 so as to extend across the bypass gap 220 to reduce the ability of intake air or exhaust gas to bypass the rotor 202.

FIG. 2A illustrates one configuration of a perimeter seal 230 wherein the seal 230 is fixedly attached to the rotor 202 in a manner that is well known in the art. In the industry, this type of perimeter seal is known as a circumferential seal. As shown in FIG. 2A the seal 230 is comprised of two basic sections, a mounting section 232 and a sealing section 234. The mounting section is attached to the outer wall 222 of the rotor 202 and a mounting plate 240. The seal 230 is bent so that the sealing section 234 is positioned substantially adjacent a sealing surface 242a which, in the embodiment of FIG. 2A, is comprised of the inner wall 224 of the housing 204.

FIG. 2B illustrates an alternative configuration of a perimeter seal 230 mounted in the bypass gap 220 to prevent air and gas from bypassing the rotor 202. In particular, the seal 230 has a mounting section 232 and a sealing section 234 wherein the mounting section 234 is bolted to the inner wall 224 of the housing 204 in a position adjacent the upper and lower ends of the housing 204. In the industry this type of perimeter seal is known as a bypass seal. The seal 230 further includes a sealing section 234 which extends into the bypass gap 220 so as to be positioned adjacent a sealing surface 242b. In this embodiment, the sealing surface 242b is comprised of a sealing plate 256 that extends circumferentially around the entire rotor 202. The exact mounting and positioning of the perimeter seals 230 of the preferred embodiment, is substantially similar to the manners of mountings of similar prior seals in existing heat exchanger units. It should therefore be appreciated that the exact manner in which the seal 230 of the preferred embodiment is mounted can vary depending upon the configuration of the heat exchanger unit without departing from the spirit of the present invention.

Figure 4:
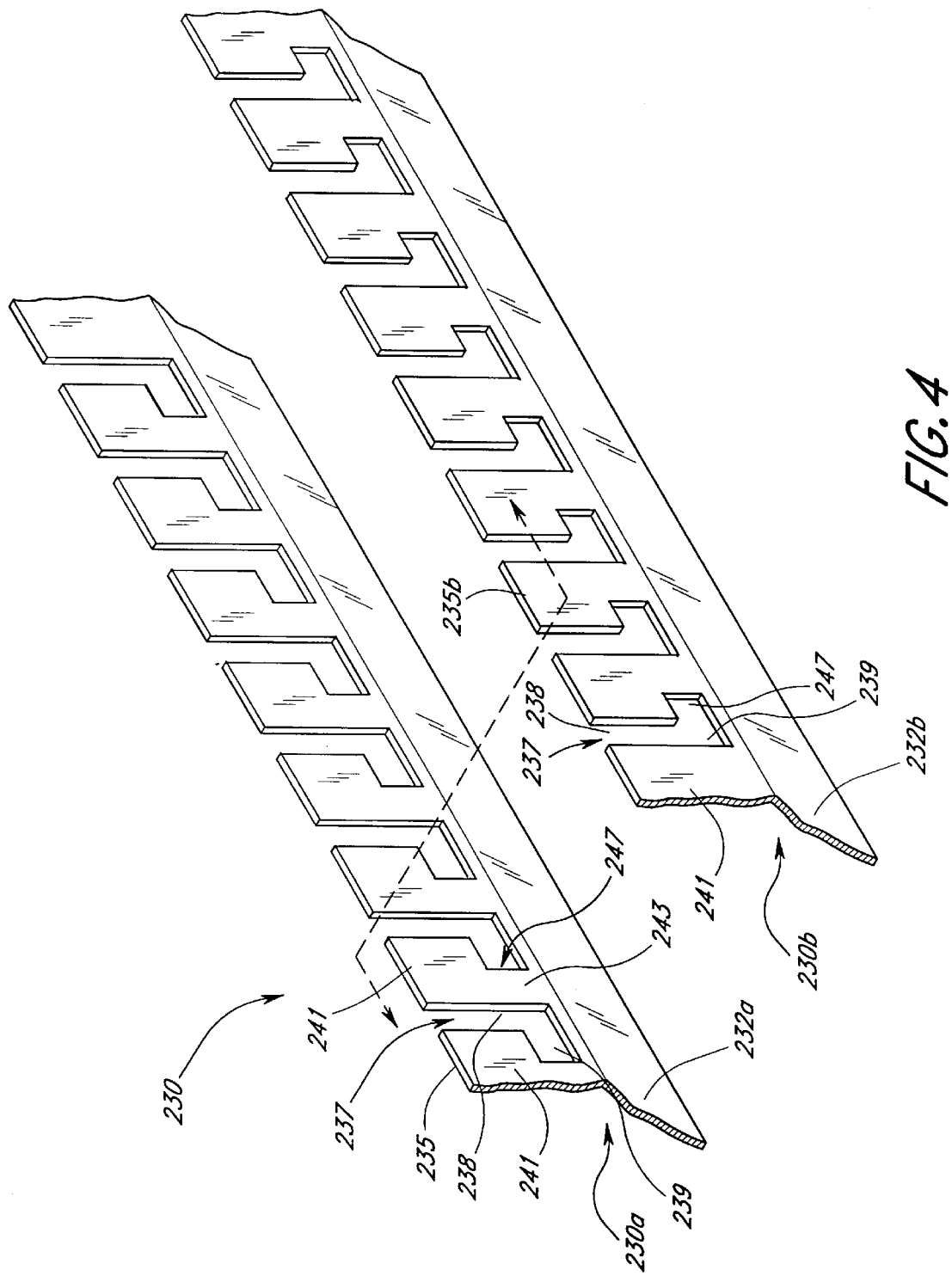
FIG. 4 is a disassembled view of an interlocking seal of the preferred embodiment comprised of a first interlocking member and a second interlocking member.

Referring now to FIGS. 4–6, the exact configuration of the perimeter seal 230 of the preferred embodiment is shown. Specifically, the seal 230 of the preferred embodiment is comprised of a first seal member 230a and a second seal member 230b. Both the first and second sealing members 230a and 230b include a mounting section 232a and 232b. Further, each of the seal members 230a and 230b include a plurality of tabs 235a and 235b which extend outward from the mounting section 232 at an acute angle which, in the preferred embodiment, is typically in the range of 35° to 45° from the plane of the mounting section 232. The plurality of tabs 235 are separated from each other by slots 237 which, in this embodiment, include a vertical section 238 which extends along the full length of the tab 235 and then a horizontal section 239 which extends underneath an upper scaling section 241 of the tabs 235 so as to define a rectangular recess 247. The horizontal section 239 of the slot 237 results in the tabs 235 having a narrower neck section 243 which connects the upper sealing section 241 of the plurality of tabs 235 to the mounting section 232.

Preferably, the horizontal section 239 of the slot 237 is sized so that the rectangular recess 247 is approximately the same size as the neck section 243 of each of the tabs 235. Elence, the upper sealing section 241 of each of the tabs 235 overlap the adjacent tab 235 when the first and second member 230a, 230b are assembled together. As is shown in FIGS. 4 and 5, the two seal members 230a and 230b are positioned so that the tabs 235 on each of the members 230a and 230b are facing in the opposite direction. Hence, the tabs 235 can overlap and interlock each other in the manner shown in FIGS. 5 and 6.

In particular, alternating neck sections 243 of the tabs 235 are positioned in the rectangular recess 247 defined by the horizontal section 239 of the slot 237. The neck sections 243 of the tabs 235 preferably do not significantly overlap, however, the sealing upper sections 242 of the tabs 235 do overlap. As the neck portions 241 do not significantly overlap, the tabs 235 have greater flexibility and can be more readily deformed as a result of contact with the sealing surface in a direction that is normal to the plane of the upper sealing section 242 of the tabs 235.

FIGS. 5 and 6 illustrate that the upper sealing sections 242 of the tabs 235 are bent subsequent to assembly of the sealing members 230a and 230b so that the faces of each of the tabs 235 are positioned adjacent each other. Further, each tab 235 is positioned in the slots 237 so that a first lateral side 260a of a tab 235a on the first member 230a is positioned adjacent a first face 252 of a first tab 235b on the second member 230b. The tab 235a on the first member 230a then has a bent section 254 so that a second lateral side 260b of the tab 235a is positioned adjacent a second face 254, opposite the first face 252, of the second tab 235c on the second member 230b. As shown in FIGS. 5 and 6, each of the tabs 235 on each of the members 230a and 230b are similarly configured and positioned.

Preferably, the first lateral side 260a and the second lateral side 260b of the tab 235a are also flattened so that the inner face of each of the lateral sides 260a and 260b are positioned adjacent the outer faces 252 and 254 of the tabs 235b and 235b respectively. As is shown in FIG. 6, the seal 230 has a typical thickness that is comprised of the thickness of two overlapping tabs 235. Only in the slots 237, is the thickness reduced to the thickness of one tab 235. In the preferred embodiment, the tabs 235 are made from a metal, such as stainless steel, that is 1/32" in thickness.

Since the typical thickness of the seal 230 is the thickness of two tabs 235, the mechanical and structural rigidity is of the seal 230 is enhanced. However, since at least one lateral side of each of the tabs 235 is not reinforced by a tab 235 on the opposite seal member 230, each tab 235 retains a higher degree of flexibility allowing for greater resilient deformation of each tab in a direction normal to the face of the tabs 235. Consequently, the seal design of the preferred embodiment provides for both structural and mechanical strength while still allowing for greater flexibility and resilient deformation.

Referring to FIGS. 2A and 2B, the seal 230 of the preferred embodiment works in the following manner. The seal 230 is initially mounted so that the sealing sections 241 of the tabs 235 are positioned so as to be substantially adjacent the sealing surface 242. When the rotor 202 deforms as a result of turndown, the tabs 235 make contact with the sealing surface 242. However, as the tabs 235 are flexible, the tabs 235 will resiliently deform in a direction normal to the plane of the tabs 235 while maintaining contact with the sealing surface 242. However, if the deformation as a result of turndown decreases, the tabs are biased by the bend between the mounting section 232 and the neck portion 243 of the tabs 235 so as to maintain contact or a desired spacing with the sealing surface. Consequently, the seal of the preferred embodiment is configured so as to be resiliently flexible to be able to maintain contact or a desired spacing with the sealing surface over a range of deformation of the rotor. Further, as the tabs are separated from each other by the slots, each of the tabs are independently flexible which provides greater flexibility and greater resiliency of the seal. Moreover, as the tabs are overlapping and interlocking, the bypass gap between the rotor 202 and the inner wall of the housing 204 can be generally entirely occluded by the seal thereby reducing the loss of efficiency of the machinery to which the preheater 200 is attached resulting from air and gases bypassing the rotor 202.

Although the foregoing description of the preferred embodiment of the present invention has shown, described and pointed out the fundamental novel features of the invention, it will be understood that various omissions, substitutions and changes in the form of the detail of the apparatus as illustrated as well as the uses thereof, may be made by those skilled in the art without departing from the spirit of the present invention. Consequently, the scope of the present invention should not be limited to the foregoing discussion, but should be defined by the claims.

What is claimed is:

1. A seal for a regenerative air preheater for sealing a bypass gap between a movable heat exchanging element and an inner wall of an enclosure encompassing the heat exchanging element comprising:

a first seal member having a mounting section that is dimensioned to be mounted to the air preheater and a plurality of tabs with slots interposed therebetween wherein the tabs extend outward from the mounting section so that when the mounting section is mounted to the air preheater, the plurality of tabs extend into the bypass gap so as to be positioned adjacent a sealing surface of the regenerative air preheater;

a second seal member having a mounting section that is dimensioned to be mounted to the air preheater and a plurality of tabs with slots interposed therebetween wherein the tabs extend outward from the mounting section so that when the mounting section is mounted to the air preheater, the plurality of tabs extend into the bypass gap so as to be positioned adjacent a sealing surface of the regenerative air preheater; and wherein the tabs and slots of the first and second seal members are dimensioned so that tabs on the first member are positioned adjacent the slots on the second member and so that the tabs on the second member are positioned adjacent the slots on the first member with the tabs and slots interlocking the two members and wherein the tabs on the first and second members are resiliently flexible so that the tabs can make contact with the sealing surface and maintain contact with the sealing surface over a range of deformation of the heat exchanging body occurring as a result of thermal distortion.

2. The seal of claim 1, wherein the slots on the first and second member include a recessed portion that further defines a narrow neck section of the tabs.

3. The seal of claim 2, wherein the tabs on the first and second members are interlocked so that the neck section of the tabs on the first member are positioned within the recessed portions of the slots on the second member and wherein the neck section of the tabs on the second member are positioned within the recessed portions of the slots of the first member.

4. The seal of claim 3, wherein the tabs are configured to move over a range of motion in a first direction normal to the plane of the plurality of tabs in response to contacting the sealing surface as a result of turndown of the movable heat exchanging body.

5. The seal of claim 4, wherein the tabs are biased in a direction opposite the first direction so as to maintain contact with the sealing surface over a range of positions of the seal with respect to the sealing surface.

6. The seal of claim 5, wherein the tabs on the first and second members extend outward from the mounting section at an angle selected so as to bias the tabs towards the scaling surface of the air preheater.

7. The seal of claim 3, wherein the mounting sections on the first and second members are spot welded together.

8. The seal of claim 4, wherein the mounting sections are configured to be mounted to an outer surface of the movable heat exchanging body so that the tabs extend towards a sealing surface defined by an inner surface of a housing containing the movable heat exchanging body.

9. The seal of claim 4, wherein the mounting sections are configured to be mounted on an inner surface of a housing containing the movable heat exchanging body so that the plurality of tabs extend towards a sealing surface defined by the movable heat exchanging body.

10. The seal of claim 1, wherein the first and second members are made of metal.

11. A perimeter seal for a regenerative air preheater for sealing a bypass gap between a movable heat exchanging element and an inner wall of an enclosure encompassing the heat exchanging element, the perimeter seal comprising:

a first seal member that is dimensioned to be mounted to an air preheater, wherein the first seal member includes a first plurality of tabs adapted to be positioned in a bypass space in said preheater adjacent a sealing surface, the first plurality of tabs having a first and a second face and a first and a second lateral sides wherein the first plurality of tabs are separated by a first plurality of slots; and a second seal member that is dimensioned to be mounted to an air preheater, wherein the second seal member includes a second plurality of tabs adapted to be positioned in the bypass space in the preheater adjacent the sealing surface, the second plurality of tabs having a first and a second face and a first and a second lateral sides wherein the second plurality of tabs are separated by a second plurality of slots and wherein the second seal member is positioned so that the second plurality of tabs are positioned within the first plurality of slots so that the first lateral side of the second plurality of tabs are positioned adjacent the first face of the first plurality of tabs and so that the second lateral side of the second plurality of tabs is positioned adjacent the second face of the first plurality of tabs.

12. The seal of claim 11, wherein the first and the second plurality of tabs includes a bent section that positioned within the first and second plurality of slots respectively.

13. The seal of claim 1, wherein the first and second plurality of slots includes a horizontal section that defines a first and second plurality of recesses.

14. The seal of claim 13, wherein the first and second plurality of tabs includes a neck section that is positionable within the first and second plurality of recesses and an upper sealing section that has a greater lateral dimension than the neck section so that the upper sealing sections of the first plurality of tabs overlap the upper sealing section of the adjacent second plurality of tabs.

15. The seal of claim 11, wherein the seal is dimensioned so that the first and second plurality of tabs engage with the sealing surface so that a force in a first direction is exerted on the first and second plurality of tabs in a first direction.

16. The seal of claim 15, wherein the first lateral side of each of the first plurality of tabs is reinforced against the force by a first lateral side of the adjacent second plurality of tabs and wherein the second lateral side of each of the first plurality of tabs reinforces a second lateral side of the adjacent second plurality of tabs.

17. The seal of claim 11, wherein the first and second plurality of tabs are configured to move over a range of motion in a first direction normal to the plane of the plurality of tabs in response to contacting the sealing surface as a result of turndown of the movable heat exchanging body.

18. the seal of claim 17, wherein the first and second plurality of tabs are biased in a direction opposite the direction of motion of the seal in response to turndown of the heat exchanging body so as to maintain contact with the sealing surface over a range of positions of the seal with respect to the sealing surface.

19. The seal of claim 18, wherein the seal is configured to be mounted to an outer surface of the movable heat exchanging body so that the first and second plurality of tabs extend toward a sealing surface defined by an inner surface of a housing containing the movable heat exchanging body.

20. The seal of claim 18, wherein the seal is configured to be mounted to an inner surface of a housing containing the movable heat exchanging body so that the plurality of tabs extend towards a sealing surface defined by the movable heat exchanging body.

* * * * *